United States Patent
Anantaraman et al.

(10) Patent No.: US 9,767,041 B2
(45) Date of Patent: Sep. 19, 2017

(54) MANAGING SECTORED CACHE

(71) Applicant: Intel Corporation, Santa Clara, CA (US)

(72) Inventors: Aravindh V. Anantaraman, Folsom, CA (US); Zvika Greenfield, Kfar Sava (IL); Israel Diamand, Aderet (IL); Anant V. Nori, Banglore (IN); Pradeep Ramachandran, Bangalore (IN); Nir Misgav, Netanya (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/721,625

(22) Filed: May 26, 2015

(65) Prior Publication Data

US 2016/0350237 A1 Dec. 1, 2016

(51) Int. Cl.
*G06F 12/12* (2016.01)
*G06F 12/08* (2016.01)
*G06F 12/121* (2016.01)
*G06F 12/0891* (2016.01)
*G06F 12/0804* (2016.01)
*G06F 12/0868* (2016.01)
(Continued)

(52) U.S. Cl.
CPC ........ *G06F 12/121* (2013.01); *G06F 12/0804* (2013.01); *G06F 12/0868* (2013.01); *G06F 12/0891* (2013.01); *G06F 12/0893* (2013.01); *G06F 9/4418* (2013.01); *G06F 12/0864* (2013.01); *G06F 12/123* (2013.01); *G06F 12/128* (2013.01); *G06F 2212/1021* (2013.01); *G06F 2212/1024* (2013.01); *G06F 2212/214* (2013.01); *G06F 2212/608* (2013.01)

(58) Field of Classification Search
None
See application file for complete search history.

(56) References Cited

U.S. PATENT DOCUMENTS 5,895,488 A * 4/1999 Loechel ............. G06F 12/0804
                                                     711/135
6,119,205 A * 9/2000 Wicki ................ G06F 12/0804
                                                     711/122

(Continued)

FOREIGN PATENT DOCUMENTS

EP          0529217      3/1993
EP          05578841     9/1993
WO          WO2013/095437 6/2013

OTHER PUBLICATIONS

PCT Application No. PCT/US16/29377: Filing date Apr. 26, 2016; Intel Corporation; International Search Report mailed Jun. 17, 2016.

*Primary Examiner* — Kaushikkumar Patel
(74) *Attorney, Agent, or Firm* — Thorpe North & Western, LLP

(57) ABSTRACT

Apparatus, systems, and methods to manage memory operations are described. In one example, a controller comprises logic to receive a first transaction to operate on a first data element in the cache memory, perform a lookup operation for the first data element in the volatile memory and in response to a failed lookup operation, to generate a cache scrub hint forward the cache scrub hint to a cache scrub engine and identify one or more cache lines to scrub based at least in part on the cache scrub hint. Other examples are also disclosed and claimed.

12 Claims, 10 Drawing Sheets

(51) Int. Cl.
*G06F 12/0893* (2016.01)
*G06F 12/0864* (2016.01)
*G06F 12/123* (2016.01)
*G06F 12/128* (2016.01)
*G06F 9/44* (2006.01)

(56) References Cited

U.S. PATENT DOCUMENTS

| | | | | |
|---|---|---|---|---|
| 6,134,634 | A * | 10/2000 | Marshall, Jr. | G06F 12/0804 711/141 |
| 6,633,299 | B1 * | 10/2003 | Sreenivas | G06F 12/0804 345/530 |
| 9,081,719 | B2 * | 7/2015 | Ramaraju | G06F 12/12 |
| 2002/0184449 | A1 * | 12/2002 | Kershaw | G06F 12/0804 711/143 |
| 2003/0056062 | A1 * | 3/2003 | Prabhu | G06F 12/0804 711/143 |
| 2003/0084250 | A1 * | 5/2003 | Gaither | G06F 12/0811 711/133 |
| 2012/0317367 | A1 * | 12/2012 | Grayson | G06F 12/0804 711/143 |
| 2014/0181413 | A1 * | 6/2014 | Manne | G06F 12/0891 711/135 |
| 2015/0019823 | A1 * | 1/2015 | Wang | G06F 12/0891 711/136 |
| 2015/0039835 | A1 | 2/2015 | Agarwal et al. | |

\* cited by examiner

MANAGING SECTORED CACHE

FIELD

The present disclosure generally relates to the field of electronics. More particularly, some examples generally relate to techniques for managing sectored cache in electronic devices.

BACKGROUND

It may be useful for electronic devices to store data in a non-volatile memory such that the data remains intact when power to the electronic device is turned off or otherwise lost. The non-volatile memory device for storing digital information in an array of non-volatile memory cells may be included in a Non-Volatile Dual In-line Memory Module (NVDIMM). Digital information stored in the non-volatile memory (for example, NAND/NOR flash memory) persists in the during power loss or system failures. After power to the electronic device is restored, the electronic device can access the stored digital data from the NVDIMM.

Logic executing in an electronic device can modify data stored in non-volatile memory. For example, logic executing on a processor of the electronic device may update a data element stored in non-volatile memory. In such an instance, the logic retrieves a copy of the data element stored in non-volatile memory and stores a copy of the data element in a volatile memory, e.g., cache memory. Some cache memories may be structured as "sectored" cache, in which multiple cache lines are grouped to form a "superline" which is identified by a single tag such that all the cache lines within that superline are identified by the single tag.

Logic executing on a processor may update data in the cache memory. Subsequent to completing any changes to the copy of the data element stored in cache memory, the logic may return, or write-back, the updated data element to non-volatile memory. Further, in some instances, e.g., prior to entry into a low-power state, logic may scrub (i.e., flush), the data stored in the cache memory to nonvolatile memory. Thus, techniques to manage sectored cache may find utility, e.g., in memory systems for electronic devices.

BRIEF DESCRIPTION OF THE DRAWINGS

The detailed description is provided with reference to the accompanying figures. The use of the same reference numbers in different figures indicates similar or identical items.

DETAILED DESCRIPTION

Figure 1:
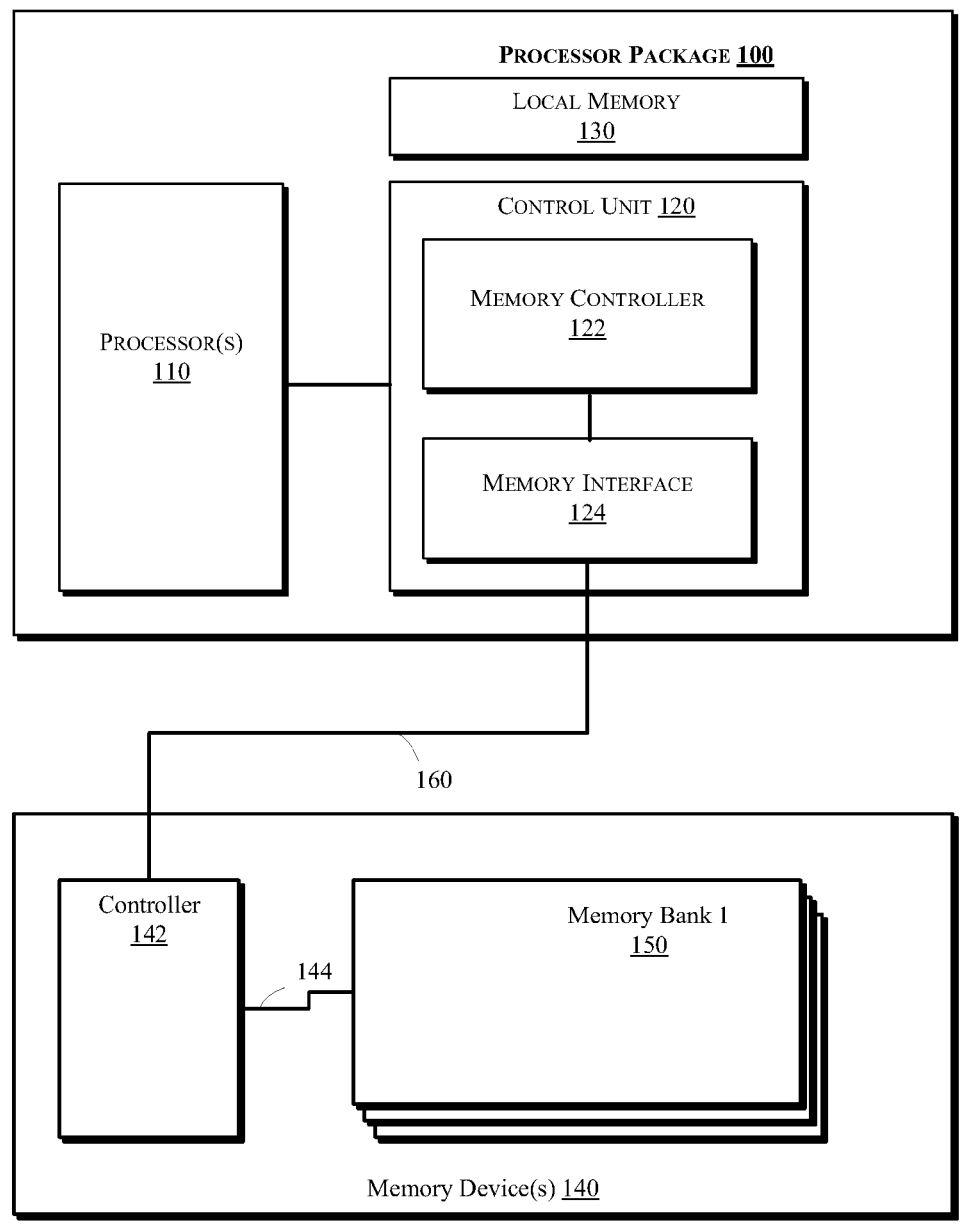
FIG. 1 is a schematic, block diagram illustration of components of apparatus to implement managing sectored cache in accordance with various examples discussed herein.

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Described herein are techniques to manage sectored cache in processing systems of electronic devices. Some examples described herein may find utility in multi-core processor devices which include integrated cache memory. More particularly, some examples described herein may find utility in electronic devices which flush processor cache to nonvolatile memory in response to a power failure or power interruption.

In brief, in a sectored cache memory, multiple cache lines (typically 64 bytes) are grouped to form what is commonly referred to as a "superline" which is identified by a single tag.

Implementing write-back operations in a sectored cache presents certain issues. In a sectored write-back cache a complete superline must be evicted if it is chosen as a replacement (i.e., victim) candidate. Since multiple cache lines within the victim superline may be dirty (i.e., not yet written to main memory), a single eviction of a superline can cause a burst of dirty cache lines to be written back to main memory. In an extreme case, every single cache line in the victim superline may have to be written back to main memory, causing a sudden spurt of demand on memory bandwidth, which results in memory latency. Further, disparities in latency between the high bandwidth data path between the processor and the cache and the relatively lower bandwidth data path to the main memory may result in slow rate of evictions from the cache, which in turn can cause fill data to be dropped because the eviction was not timely. Dropping fill data causes subsequent accesses to these addresses that would have been hits to be misses.

Another issue with sectored cache is the amount of time required to flush the cache when the electronic device which comprises the cache is moved to a low-power state. This large flush time penalty can raises difficulties in making a quick transition to a low-power state. In order to enter a lower power state in which cache contents cannot be retained, dirty data in the cache must be flushed to main memory before power can be turned off. In some examples as much as 80% of a cache memory may be dirty. Thus, in some examples a 128 MB cache as much as approximately 100 MB may be dirty across a wide range of workloads. It can take several milliseconds to flush 100 MB of data to main memory, which can cause a significant delay in transitioning to a low-power state.

Described herein are techniques to manage sectored cache in a way that addresses these and other issues. In a first aspect, miss detection is decoupled from victim selection. In a second aspect, a proactive opportunistic scrubbing mechanism may be implemented to increase the likelihood of finding clean victim superlines. Additional structural features and operations to implement managing sectored cache will be described with reference to FIGS. 1-5, below.

FIG. 1 is a schematic, block diagram illustration of components of apparatus to manage sectored cache in accordance with various examples discussed herein. Referring to FIG. 1, in some examples a processor 100 may comprise one or more processors 110 coupled to a control unit 120 and a local memory 130. Control unit 120 comprises a memory controller 122 and a memory interface 124.

Memory interface 124 is coupled to one or more remote memory devices 140 by a communication bus 160. Memory device 140 may comprise a controller 142 and one or more memory banks 150. In various examples, at least some of the memory banks 150 may be implemented using nonvolatile memory, e.g., ferroelectric random-access memory (Fe-TRAM), nanowire-based non-volatile memory, memory that incorporates memristor technology, a static random access memory (SRAM), three dimensional (3D) cross point memory such as phase change memory (PCM), spin-transfer torque memory (STT-RAM) or NAND memory. In some examples the memory device(s) 140 may comprise one or more nonvolatile direct in-line memory modules (NVDIMMs) coupled to a memory channel 144 which provides a communication link to controller 142. The specific configuration of the memory bank(s) 150 in the memory device(s) 140 is not critical.

Figure 2:
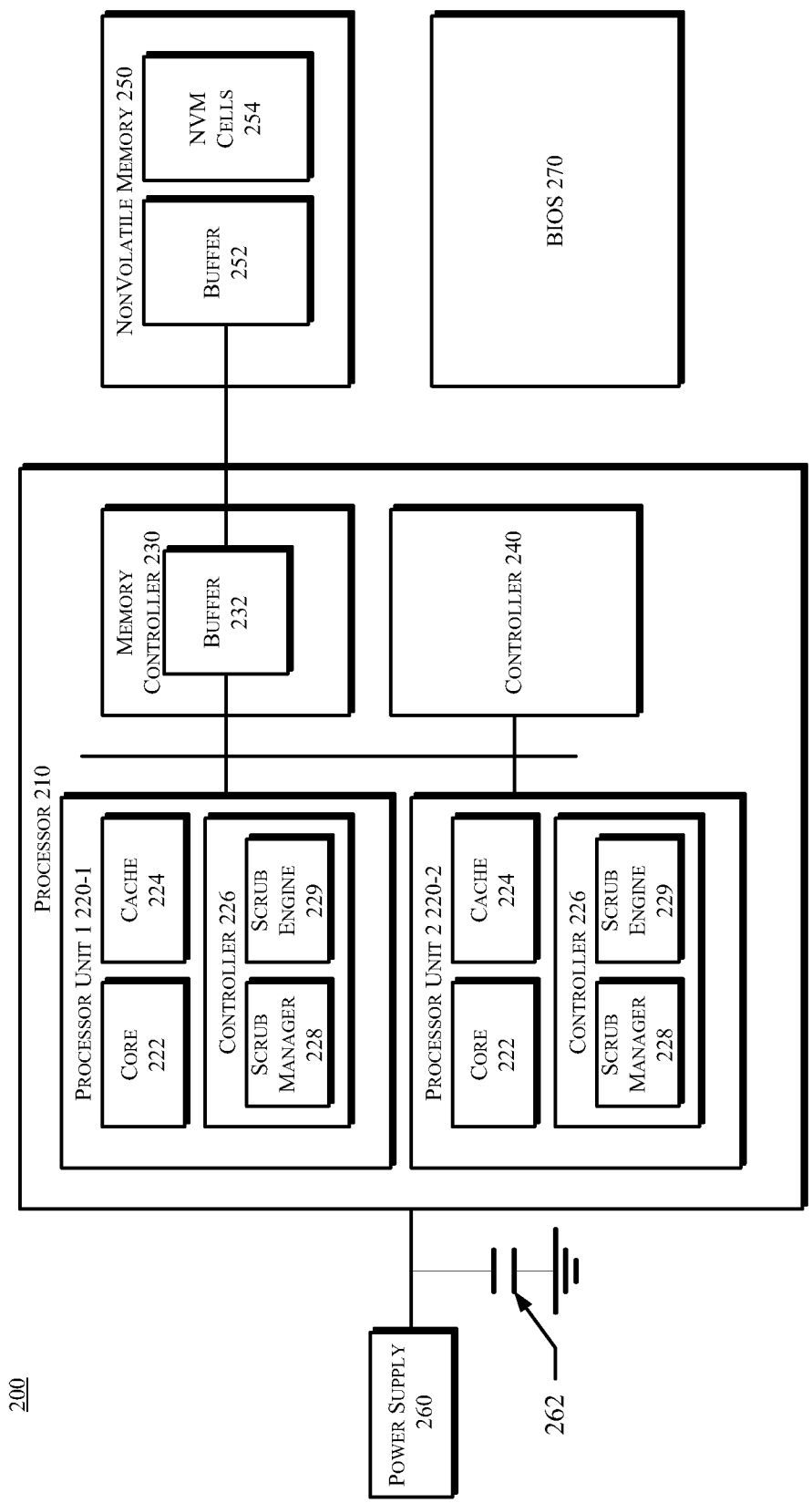
FIG. 2 is a schematic block diagram of a processing environment which may be adapted to implement managing sectored cache in accordance with various examples discussed herein.

FIG. 2 is a schematic block diagram of a processing environment which may be adapted to manage sectored cache in accordance with various examples discussed herein. Referring to FIG. 2, a processor environment 200 may comprise at least one processor 210 coupled to a power supply 260 and to nonvolatile memory 250. An energy storage device 262 such as one or more capacitors stores a portion of the power provided by power supply 260. As described above, in the event of a power failure such as a condition in which the power supply 260 no longer outputs power in a proper voltage range to power processor environment 200, the energy stored in energy storage resource 262 continues to provide appropriate power to processor 210 for at least a limited amount of holdup time.

Processor 210 may comprise one or more processor units 220-1, 220-2, which may be referred to herein collectively by reference numeral 220. Processor 210 may further comprise a memory controller 230 having a buffer 232 and a controller 240. Each processor unit 220 may comprise a core 222, cache memory 224, and a cache controller 226, which in turn may include logic which defines a scrub manager 228 and a scrub engine 229.

The processor core(s) 222 execute logic instructions to implement one or more processing threads. Core(s) 222 may work independently or cooperatively to define a multi-core processing environment. Cache 224 may be implemented as multi-level fast access cache defined in volatile memory, typically on the same die as the core(s) 222.

Figure 3:
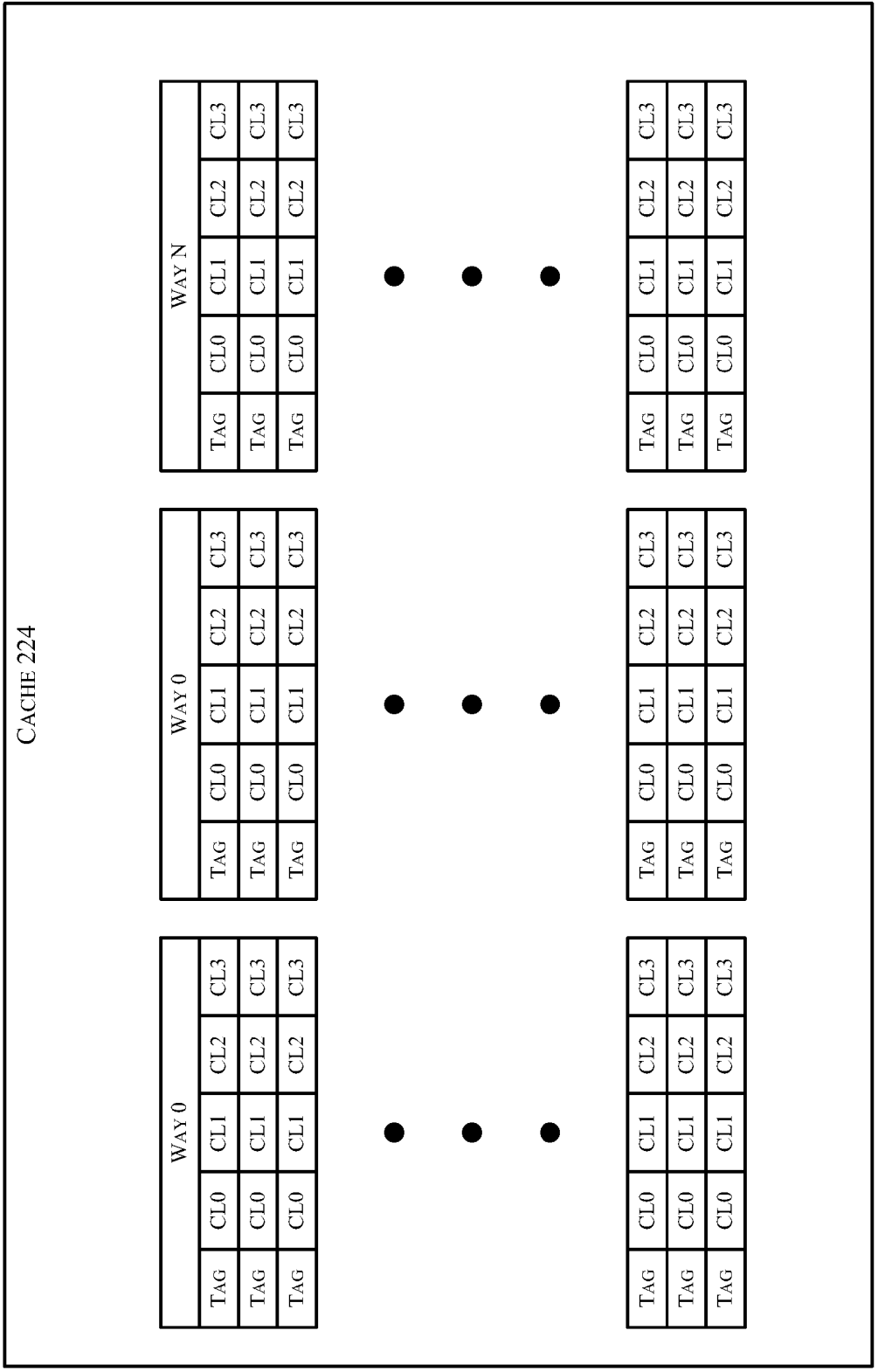
FIG. 3 is a schematic illustration of a sectored cache in accordance with various examples discussed herein

FIG. 3 is a schematic illustration of a sectored cache in accordance with various examples discussed herein. Referring to FIG. 3, a sectored cache may comprise two or more ways, indicated in FIG. 3 as WAY0, WAY1, up to WAY N. Each cache superline in each way may comprise multiple cache lines indicated in FIG. 3 as CL0, CL1, CL2, CL3. Each cache superline is identified by a single tag. Cache 224 may be configured as a level 1 (L1) or level 2 (L2) cache or any other level of cache used in a similar memory system.

Furthermore, the cache 224 may be configured as an instruction cache, a data cache, or a unified cache for storing both instructions and data.

In some embodiments, the cache may be integrated with a processor, as illustrated in FIG. 2. In operation, core 222 is configured to communicate addresses and data with cache 224. Cache controller 226 is configured to receive address information from core 222. Cache controller 226 is also configured to receive data from nonvolatile memory 250 and/or core 222. Cache controller 222 is configured to use the address information to select a cache storage line within which to retrieve or store the corresponding data bytes. For example, the cache controller 226 may be configured to access a plurality of tags that track which entries are present in the cache 224.

The cache controller 226 may be configured to partition each set into one or more sectors, where each sector includes two or more ways, and to maintain one or more usage status indicators that indicate the relative usage status of these sectors. For example, a least recently used (LRU) usage status pointer may point to the LRU sector in the set. Alternately, status bits and/or counters may be used to track the relative usage status of each sector in the set.

In some examples controller 226 implements cache management operations to facilitate efficient scrubbing techniques for a sectored cache such as cache 224. Cache management operations implemented by controller 226 will be described with reference to FIGS. 4 and 5. In some examples the operations depicted in FIGS. 4 and 5 may be implemented by the cache controller, and more particularly by the scrub manager 228 and/or by the scrub engine 229.

Figure 4:
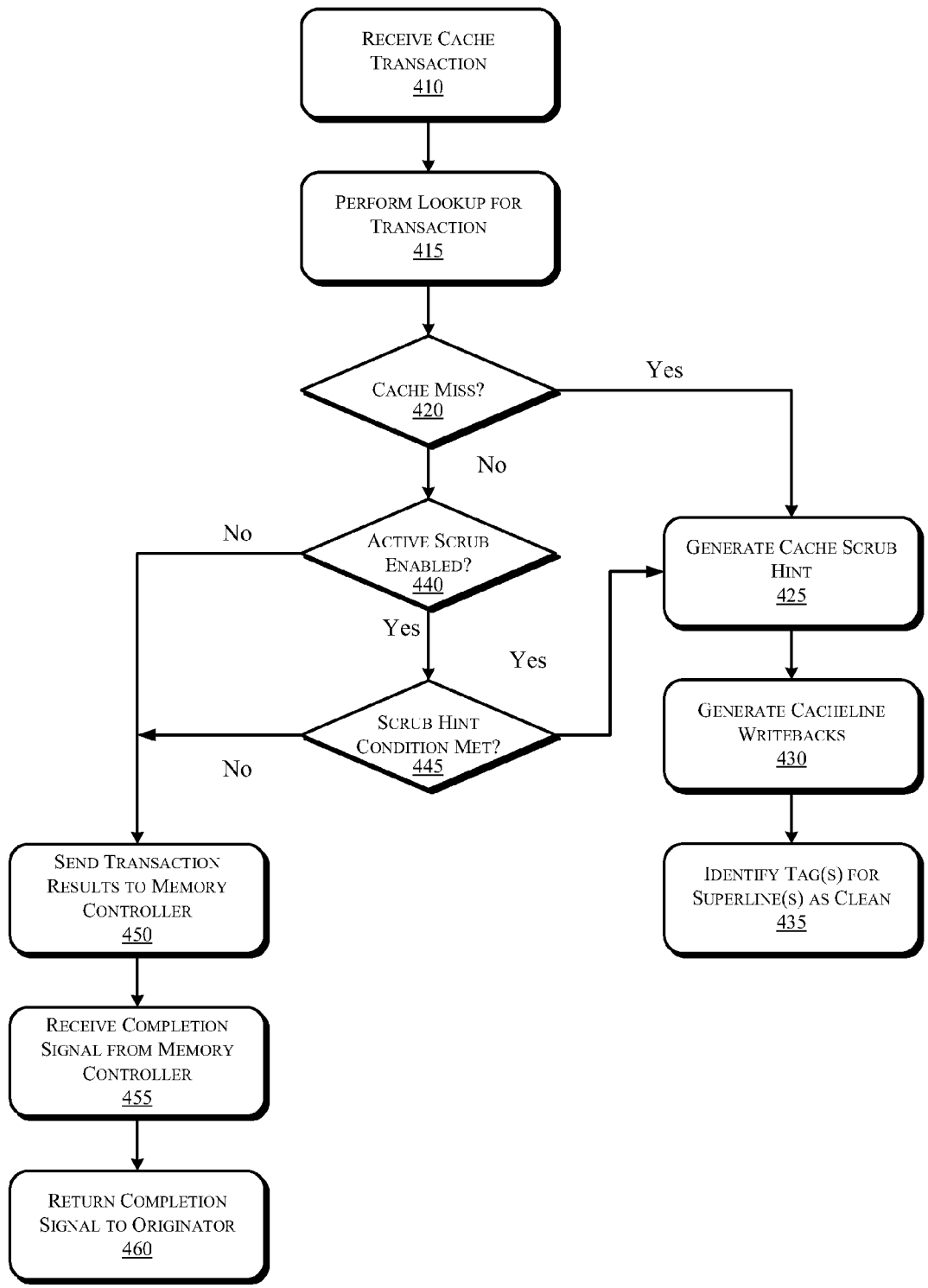
FIG. 4 is a flowchart illustrating operations in a method to manage sectored cache in accordance with various examples discussed herein.

Referring first to FIG. 4, at operation 410 a cache transaction is received in cache controller 226. By way of example, the cache transaction may be a cache read operation. At operation 415 the cache controller 226 performs a lookup operation in cache 224 to locate the data identified in the cache transaction At operation 420 the cache controller 226 determines whether the lookup operation for the cache transaction received in operation 410 is resulted in a cache miss (i.e., when the cache 224 does not contain the data requested in the transaction request). If, at operation 420, it is determined that the lookup in operation 415 resulted in a cache miss, then control passes to operation 425 and the cache controller 226 generates a cache scrub hint. In some examples the scrub manager 228 may select one or more cache ways that are dirty and sends these ways as a cache scrub hint to the cache scrub engine. At operation 430 the cache scrub engine 229 generates cacheline writebacks for the superline(s) associated with the cache scrub hint in order to write the data in the superline(s) back to nonvolatile memory 250. Control then passes to operation 435, where the scrub manager 228 identifies one or more tag(s) for the superlines(s) that were flushed in operation 430 as clean.

By contrast, if at operation 420 the lookup for the cache transaction did not result in a cache miss (i.e., if the transaction resulted in a cache hit) then control passes to operation 440 and the cache controller 226 determines whether an active scrub feature is enabled. If, at operation 440, an active scrub feature is not enabled then control passes to operation 450 and the results of the cache transaction are sent to the memory controller 230 for main memory 250. At operation 455 the cache controller 226 receives a completion signal from the memory controller 230 for main memory 250, and at operation 460 the cache controller 226 returns a completion signal to the originator of the cache transaction received in operation 410.

By contrast, if at operation 440 an active scrub feature is enabled then control passes to operation 445 and the cache controller 226 determines whether one or more conditions are met to generate a scrub hint. In some examples the controller may proactively implement cache scrubbing operations in response to one or more conditions. The conditions may correspond to an event (e.g., a cache hit or the elapse of a specified time period) or may correspond to operating conditions of the cache controller 226 (e.g., if the operating capacity of the cache controller 226 is below a threshold). Various conditions will be described below with reference to FIGS. 5B and 5C.

If, at operation 445, one or more conditions are met then control passes to operations 425-435, as described above. By contrast, if at operation 445 one or more scrub hint conditions are not met then control passes to operations 450-460, as described above.

Figure 5A:
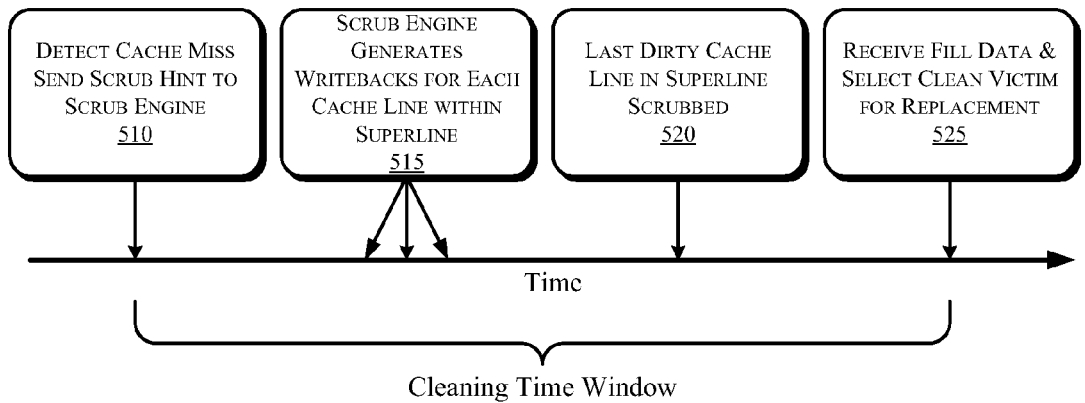
FIGS. 5A-5C are diagrams illustrating operations in method to manage sectored cache in accordance with various examples discussed herein.
Figure 5B:
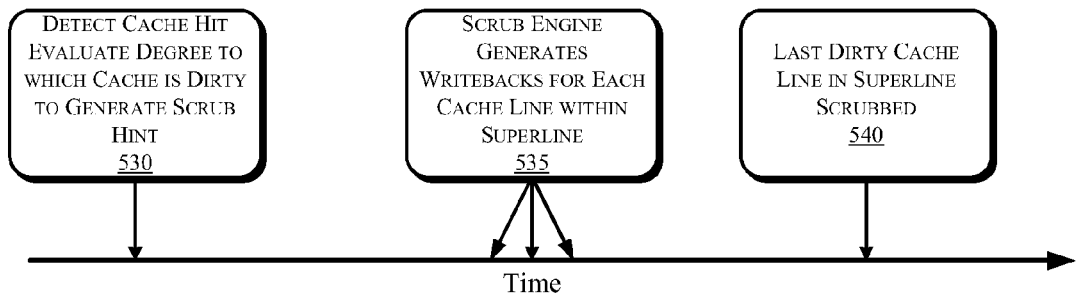
Figure 5C:
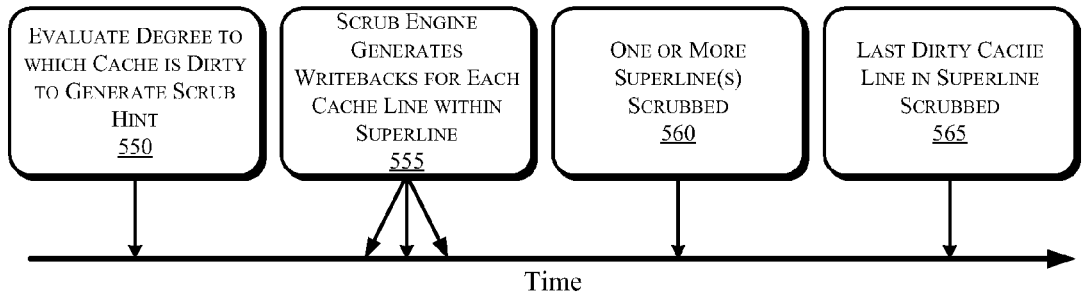

FIGS. 5A-5C are diagrams illustrating the timing of operations in method to manage sectored cache in accordance with various examples discussed herein. FIG. 5A illustrates operation of the cache controller 226 in the context of a cache miss scenario. Referring to FIG. 5A, at operation 510 the cache manager 228 detects a cache miss (i.e., a failed lookup operation) at a first point in time and, in response to the failed lookup operation the controller sends a cache scrub hint to the cache scrub engine 229. In some examples the cache hint may identify one or more superlines to be scrubbed. At operation 515 the cache scrub engine 229 generates cache writeback operations for each cache line within the superline(s) identified for scrubbing. Multiple writeback operations may be required to clean the superline(s).

At operation 520 the last dirty cache line in the superline(s) is scrubbed, resulting in a clean cache superline. At operation 525 the cache controller 226 receives fill data from the memory controller 230 and selects a clean victim superline(s) for replacement. Thus, in the context of a cache miss the operations described herein delay the operation of victim selection until after fill data is returned from the memory controller 230, thereby providing a cleaning time window during which the scrub manager 228 and the scrub engine 229 can cooperate to clean one or more superline(s) in the cache.

FIG. 5B illustrates operation of the cache controller 226 in the context of a cache hit scenario. Referring to FIG. 5B, at operation 530 the cache manager 228 detects a cache hit (i.e., a successful lookup operation) at a first point in time and, in response to the successful lookup operation the scrub manager 228 generates a scrub hint to send to the scrub engine 229. In one example the scrub manager 228 generates a scrub hint only if the number of dirty ways in a set meets or exceeds a threshold number, which may be fixed or programmable. The scrub manager 228 may use one or more techniques to select a cache hint. For example, scrub manager 228 may select as a cache hint the least recently used (LRU) way in a set that received a cache miss. Alternatively, the scrub manager may select as a cache hint the least recently used (LRU) of all the modified ways in the set. The scrub manager 228 sends the cache scrub hint to the cache scrub engine 229. In some examples the cache hint may identify one or more superlines to be scrubbed.

At operation 535 the cache scrub engine 229 generates cache writeback operations for each cache line within the superline(s) identified for scrubbing. Multiple writeback operations may be required to clean the superline(s). At operation 540 the last dirty cache line in the superline(s) is scrubbed, resulting in a clean cache superline.

FIG. 5C illustrates operation of the cache controller 226 in the context of a free-roaming or event-driven scrubbing operation. Referring to FIG. 5C, at operation 550 the cache manager 228 evaluates the degree to which the cache is dirty in order to determine whether to send a scrub hint to send to the scrub engine 229. In one example the scrub manager 228 generates a scrub hint only if the number of dirty ways in a set meets or exceeds a threshold number, which may be fixed or programmable. The scrub manager 228 may use one or more techniques to select a cache hint. For example, scrub manager 228 may select as a cache hint the least recently used (LRU) way in a set that received a cache miss. Alternatively, the scrub manager may select as a cache hint the least recently used (LRU) of all the modified ways in the set. The scrub manager 228 sends the cache scrub hint to the cache scrub engine 229. In some examples the cache hint may identify one or more superlines to be scrubbed.

At operation 555 the cache scrub engine 229 generates cache writeback operations for each cache line within the superline(s) identified for scrubbing. Multiple writeback operations may be required to clean the superline(s). At operation 560 the cache scrub engine scrubs one or more superlines in the cache 224. At operation 565 the last dirty cache line in the superline(s) is scrubbed, resulting in a clean cache superline.

In some examples it may be useful to throttle a free-roaming or event-driven scrubbing operation. An unconstrained scrubbing operation can be consume large amounts of power by executing excessive writes and may decrease performance by consuming excessive bandwidth in the memory system. Thus, in some examples the scrubbing operation may be throttled using various techniques. In a first technique, the degree to which a cache is dirty may be used as a triggering mechanism. For example, the number of dirty lines in the cache may be tracked using a simple counter mechanism. The counter may be incremented every time the state of a cache is changed from clean (I/E) to dirty (M) and it is decremented every time a cache line is changed from dirty (M) to clean (E/I). The scrubbing operation is engaged only when the number of dirty lines exceeds a certain programmable threshold. In a second technique the scrubbing operation will be engaged only if there is sufficient spare memory bandwidth available. This ensures that the scrubbing operation does not oversubscribe memory bandwidth due to scrub requests.

Thus, the operations depicted in FIGS. 4-5 enable a processing unit such as cache controller 226 to manage sectored cache.

Figure 6:
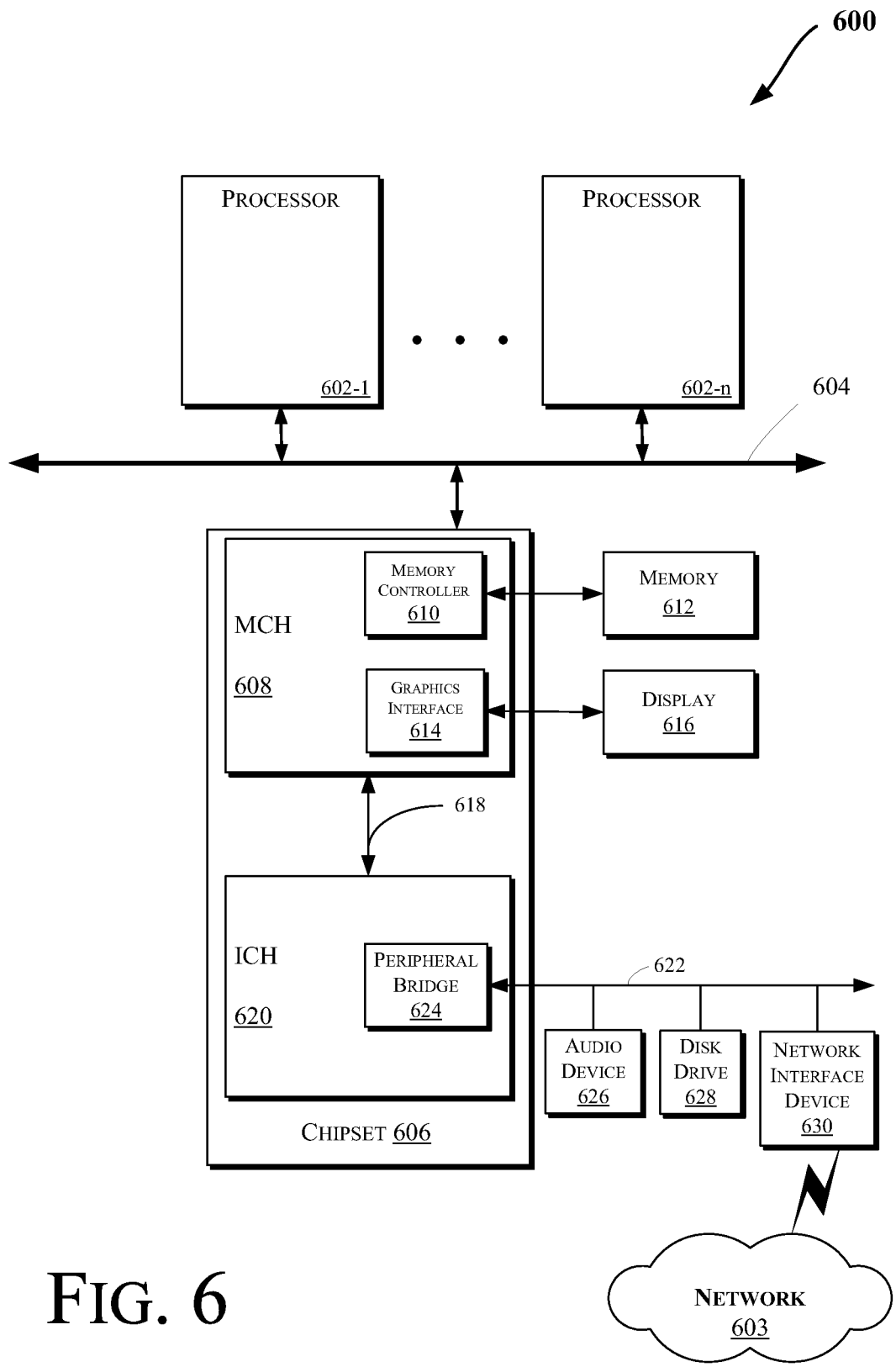
FIGS. 6-10 are schematic, block diagram illustrations of electronic devices which may be adapted to manage sectored cache in accordance with various examples discussed herein.

As described above, in some examples the electronic device may be embodied as a computer system. FIG. 6 illustrates a block diagram of a computing system 600 in accordance with an example. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the CPU 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
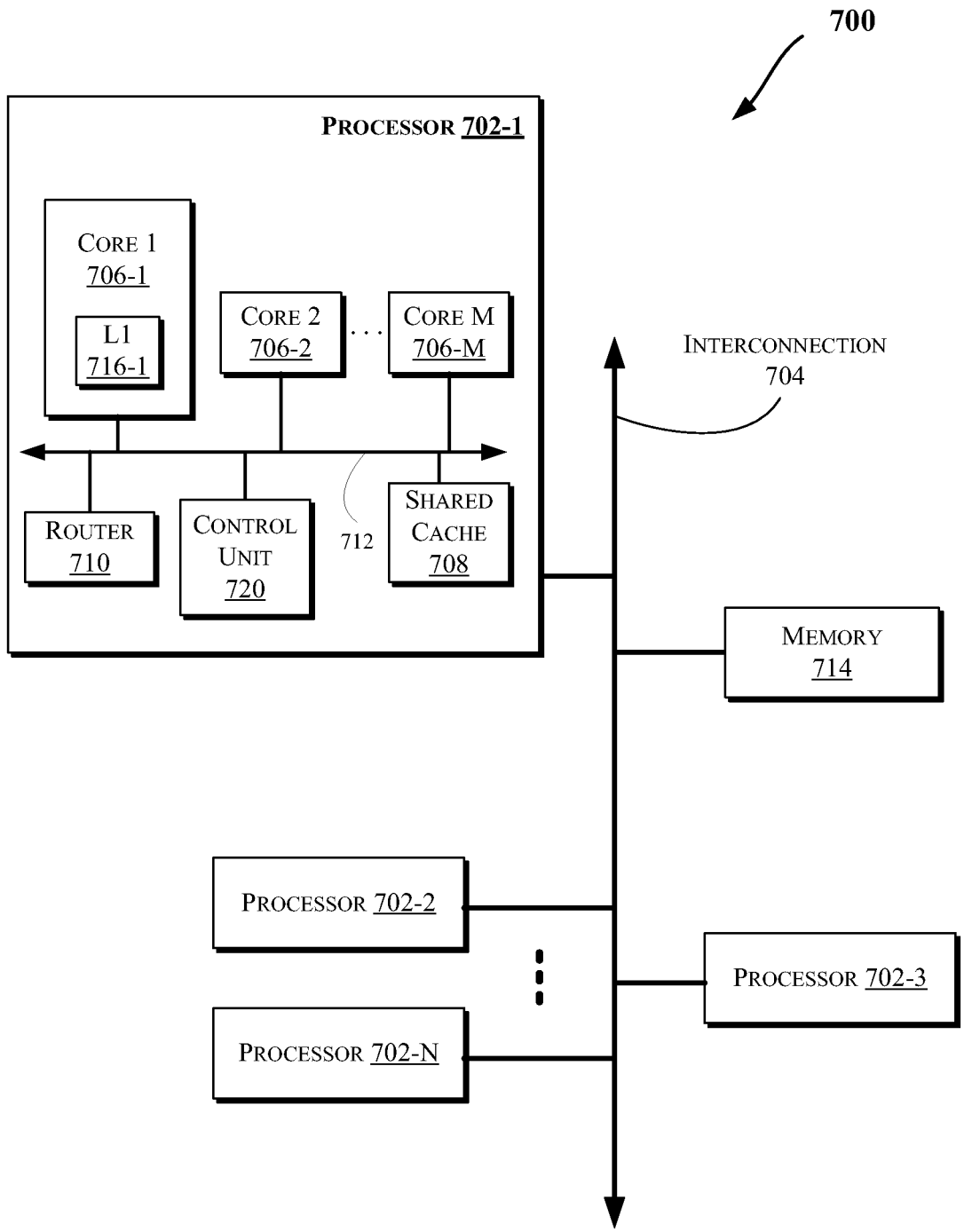

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716"). In one example, the control unit 720 may include logic to implement the operations described above with reference to the memory controller 122 in FIG. 2.

Figure 8:
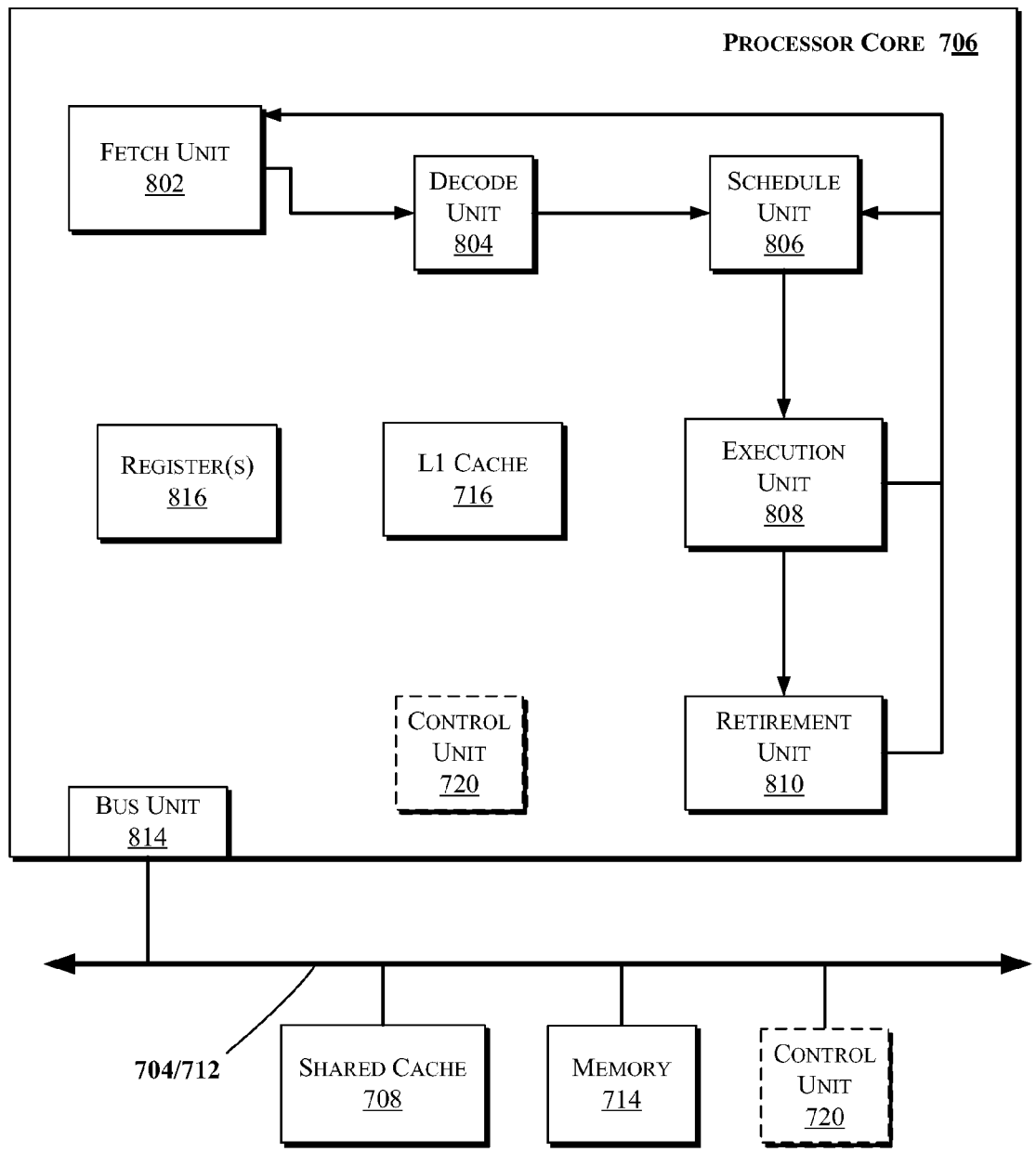

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
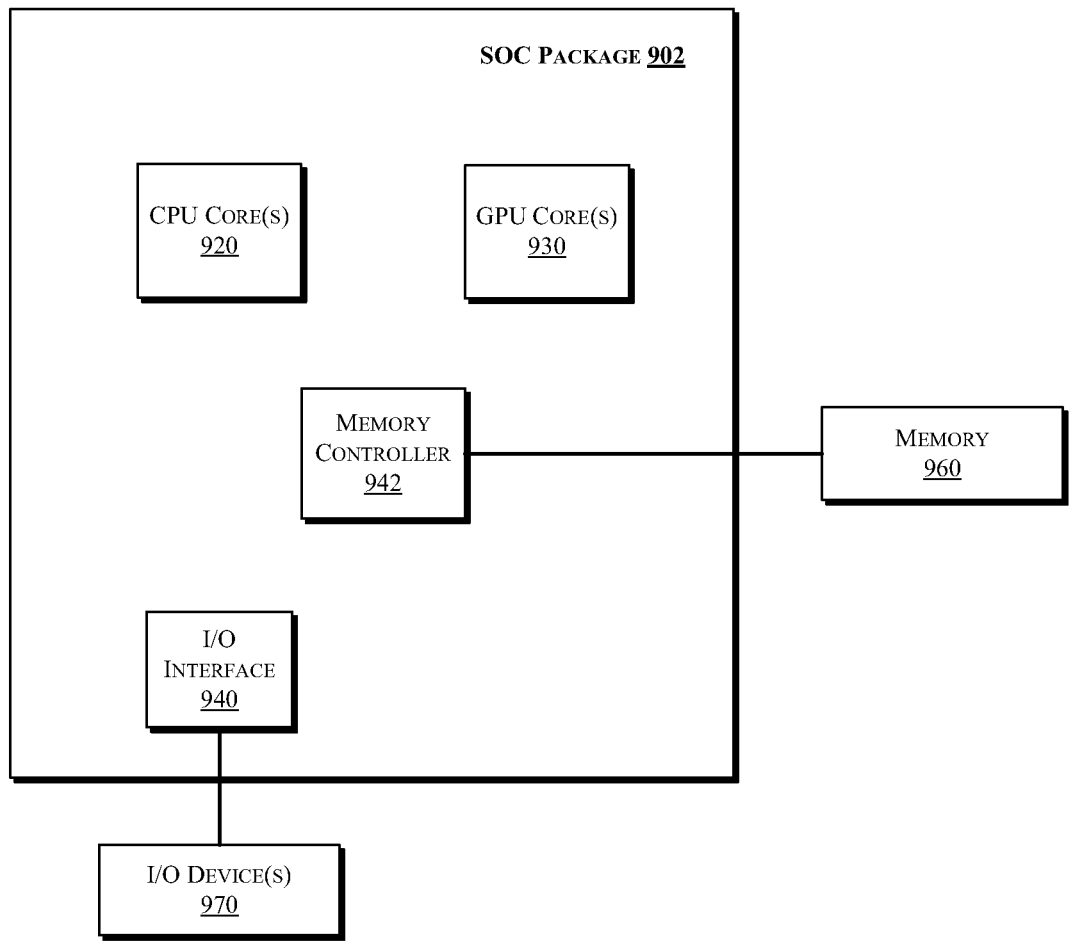

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

Figure 10:
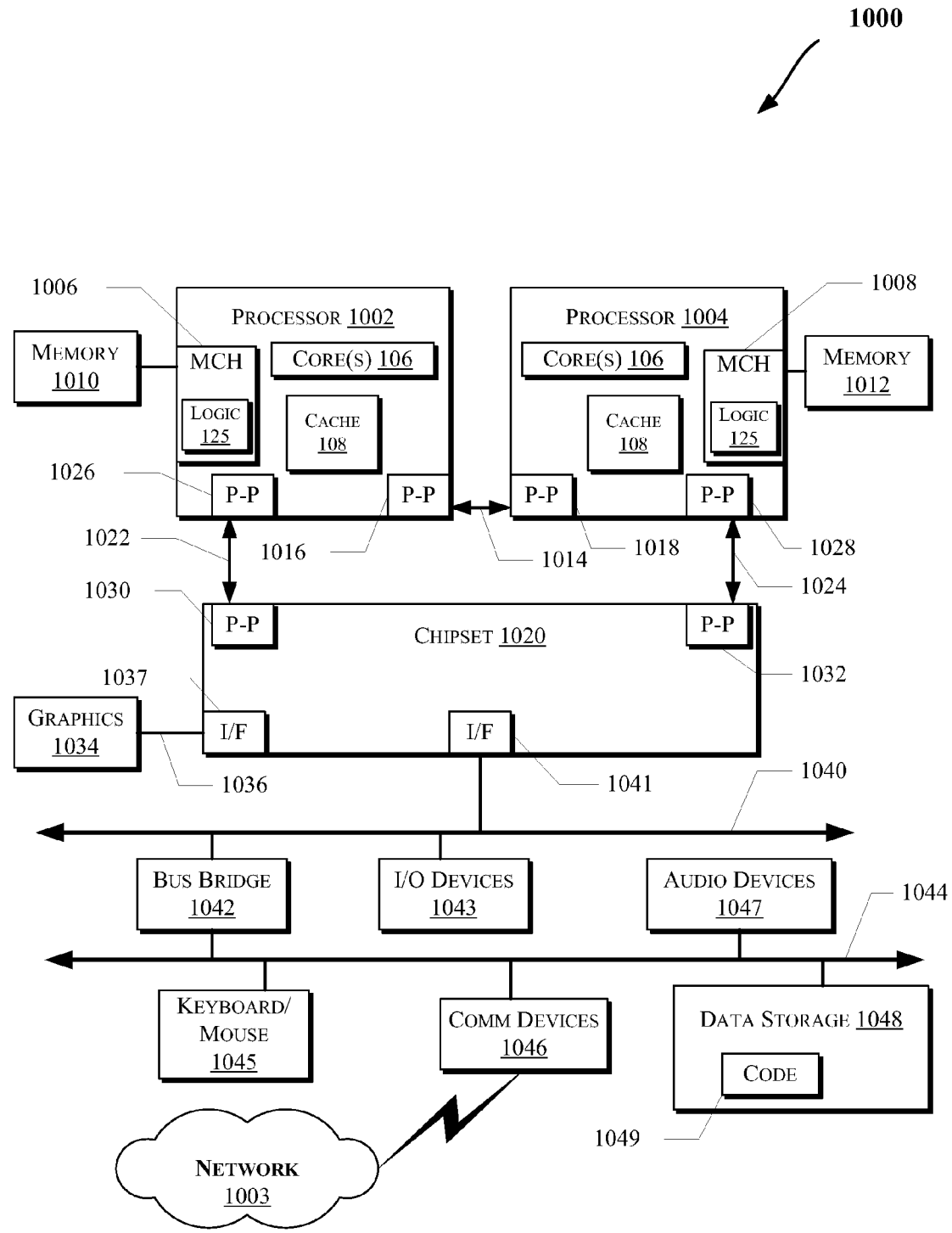

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some examples.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 902 and 904. Other examples, however, may exist in other circuits, logic units, or devices within the system 900 of FIG. 9. Furthermore, other examples may be distributed throughout several circuits, logic units, or devices illustrated in FIG. 9.

The chipset 920 may communicate with a bus 940 using a PtP interface circuit 941. The bus 940 may have one or more devices that communicate with it, such as a bus bridge 942 and I/O devices 943. Via a bus 944, the bus bridge 943 may communicate with other devices such as a keyboard/mouse 945, communication devices 946 (such as modems, network interface devices, or other communication devices that may communicate with the computer network 803), audio I/O device, and/or a data storage device 948. The data storage device 948 (which may be a hard disk drive or a NAND flash based solid state drive) may store code 949 that may be executed by the processors 902 and/or 904.

The following pertains to further examples.

Example 1 is an electronic device comprising at least one processor, a cache memory communicatively coupled to the at least one processor, a controller communicatively coupled to the cache memory and comprising logic, at least partially including hardware logic, to receive a first transaction to operate on a first data element in the cache memory, perform a lookup operation for the first data element in the volatile memory, and in response to a failed lookup operation, to generate a cache scrub hint, forward the cache scrub hint to a cache scrub engine, and identify one or more cache lines to scrub based at least in part on the cache scrub hint.

In Example 2, the subject matter of Example 1 can optionally include logic, at least partially including hardware logic, to scrub a section of the cache memory associated with the one or more tags.

In Example 3, the subject matter of any one of Examples 1-2 can optionally include logic, at least partially including hardware logic, to designate the section of the cache memory as a potential victim for a replacement operation.

In Example 4, the subject matter of any one of Examples 1-3 can optionally include logic, at least partially including hardware logic, to implement a replacement operation to overwrite at least a portion of the data in the potential victim.

In Example 5, the subject matter of any one of Examples 1-4 can optionally include logic, at least partially including hardware logic, to determine whether an active cache scrub capability is activated, and in response to a determination that the active cache scrub capability is activated, to generate a cache scrub hint, forward the cache scrub hint to a cache scrub engine, and identify one or more cache lines to scrub based at least in part on the cache scrub hint.

In Example 6, the subject matter of any one of Examples 1-5 can optionally include logic, at least partially including hardware logic, to locate a least recently used (LRU) cache block and assign the LRU cache block as a cache hint.

In Example 7, the subject matter of any one of Examples 1-6 can optionally include logic, at least partially including hardware logic, to locate a cache block associated with a cache hit and assign cache block as a cache hint.

Example 8 is controller communicatively coupled to a cache memory and comprising logic, at least partially including hardware logic, to receive a first transaction to operate on a first data element in the cache memory, perform a lookup operation for the first data element in the volatile memory, and in response to a failed lookup operation, to generate a cache scrub hint, forward the cache scrub hint to a cache scrub engine, and identify one or more cache lines to scrub based at least in part on the cache scrub hint.

In Example 9, the subject matter of Example 8 can optionally include logic, at least partially including hardware logic, to scrub a section of the cache memory associated with the one or more tags.

In Example 10, the subject matter of any one of Examples 8-9 can optionally include logic, at least partially including hardware logic, to designate the section of the cache memory as a potential victim for a replacement operation.

In Example 11, the subject matter of any one of Examples 8-10 can optionally include logic, at least partially including hardware logic, to implement a replacement operation to overwrite at least a portion of the data in the potential victim.

In Example 12, the subject matter of any one of Examples 8-11 can optionally include logic, at least partially including hardware logic, to determine whether an active cache scrub capability is activated, and in response to a determination that the active cache scrub capability is activated, to generate a cache scrub hint, forward the cache scrub hint to a cache scrub engine, and identify one or more cache lines to scrub based at least in part on the cache scrub hint.

In Example 13, the subject matter of any one of Examples 8-12 can optionally include logic, at least partially including hardware logic, to locate a least recently used (LRU) cache block and assign the LRU cache block as a cache hint.

In Example 14, the subject matter of any one of Examples 8-13 can optionally include logic, at least partially including hardware logic, to locate a cache block associated with a cache hit and assign cache block as a cache hint.

Example 15 is an electronic device, comprising at least one processor, a cache memory communicatively coupled to the at least one processor, a controller communicatively coupled to the cache memory and comprising logic, at least partially including hardware logic, to generate a cache scrub hint, forward the cache scrub hint to a cache scrub engine, and identify one or more cache lines to scrub based at least in part on the cache scrub hint.

In Example 16, the subject matter of Example 15 can optionally include logic, at least partially including hardware logic, to scrub a section of the cache memory associated with the one or more tags.

In Example 17, the subject matter of any one of Examples 15-16 can optionally include logic, at least partially including hardware logic, to monitor a number of dirty cache lines in the cache memory and generate a cache scrub hint only when the number of dirty cache lines exceeds a threshold.

In Example 18, the subject matter of any one of Examples 15-17 can optionally include logic, at least partially including hardware logic, to implement a replacement operation to overwrite at least a portion of the data in the potential victim.

Example 18 is a controller communicatively coupled to a cache memory and comprising logic, at least partially including hardware logic, to generate a cache scrub hint, forward the cache scrub hint to a cache scrub engine, and identify one or more cache lines to scrub based at least in part on the cache scrub hint.

In Example 19, the subject matter of Example 18 can optionally include logic, at least partially including hardware logic, to scrub a section of the cache memory associated with the one or more tags.

In Example 20 the subject matter of any one of Examples 18-19 can optionally include logic, at least partially including hardware logic, to monitor a number of dirty cache lines in the cache memory and generate a cache scrub hint only when the number of dirty cache lines exceeds a threshold.

In various examples, the operations discussed herein, e.g., with reference to FIGS. 1-10, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An electronic device comprising:
   at least one processor;
   a cache memory communicatively coupled to the at least one processor;
   a controller communicatively coupled to the cache memory and comprising logic, at least partially including hardware logic, to:
      receive a first transaction to operate on a first data element in the cache memory;
      perform a lookup operation for the first data element in the cache memory; and
      in response to a failed lookup operation, to:
         generate a cache scrub hint;
         forward the cache scrub hint to a cache scrub engine; and
         identify one or more cache lines to scrub based at least in part on the cache scrub hint; and
      in response to a successful lookup operation, to:
         determine whether an active cache scrub capability is activated; and
         in response to a determination that the active cache scrub capability is activated, to:
            generate a cache scrub hint;
            forward the cache scrub hint to a cache scrub engine; and
            identify one or more cache lines to scrub based at least in part on the cache scrub hint.

2. The electronic device of claim 1, wherein the controller further comprises logic, at least partially including hardware logic, to:
   scrub a section of the cache memory associated with one or more tags.

3. The electronic device of claim 2, wherein the controller further comprises logic, at least partially including hardware logic, to:
   designate the section of the cache memory as a potential victim for a replacement operation.

4. The electronic device of claim 3, wherein the controller further comprises logic, at least partially including hardware logic, to:
   implement a replacement operation to overwrite at least a portion of data in the potential victim.

5. The electronic device of claim 1, wherein the controller further comprises logic, at least partially including hardware logic, to:
   locate a least recently used (LRU) cache block; and
   assign the LRU cache block as a cache hint.

6. The electronic device of claim 1, wherein the controller further comprises logic, at least partially including hardware logic, to:
   locate a cache block associated with a cache hit; and
   assign cache block as a cache hint.

7. A controller communicatively coupled to a cache memory and comprising logic, at least partially including hardware logic, to:
   receive a first transaction to operate on a first data element in the cache memory;
   perform a lookup operation for the first data element in the cache memory; and
   in response to a failed lookup operation, to:
      generate a cache scrub hint;
      forward the cache scrub hint to a cache scrub engine; and
      identify one or more cache lines to scrub based at least in part on the cache scrub hint; and
   in response to a successful lookup operation, to:
      determine whether an active cache scrub capability is activated; and
      in response to a determination that the active cache scrub capability is activated, to:
         generate a cache scrub hint;
         forward the cache scrub hint to a cache scrub engine; and
         identify one or more cache lines to scrub based at least in part on the cache scrub hint.

8. The controller of claim 7, wherein the controller further comprises logic, at least partially including hardware logic, to:
   scrub a section of the cache memory associated with one or more tags.

9. The controller of claim 8, wherein the controller further comprises logic, at least partially including hardware logic, to:
   designate the section of the cache memory as a potential victim for a replacement operation.

10. The controller of claim 9, wherein the controller further comprises logic, at least partially including hardware logic, to:
    implement a replacement operation to overwrite at least a portion of data in the potential victim.

11. The controller of claim 7, wherein the controller further comprises logic, at least partially including hardware logic, to:
    locate a least recently used (LRU) cache block; and
    assign the LRU cache block as a cache hint.

12. The controller of claim 7, wherein the controller further comprises logic, at least partially including hardware logic, to:
    locate a cache block associated with a cache hit; and
    assign cache block as a cache hint.

* * * * *